United States Patent
Fujii (10) Patent No.: US 9,493,374 B2
(45) Date of Patent: Nov. 15, 2016

(54) GLASS BASE MATERIAL ELONGATING METHOD

(71) Applicant: Shin-Etsu Chemical Co., Ltd., Tokyo (JP)

(72) Inventor: Hideki Fujii, Gunma (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 669 days.

(21) Appl. No.: 13/757,860

(22) Filed: Feb. 4, 2013

(65) Prior Publication Data

US 2013/0205833 A1    Aug. 15, 2013

(30) Foreign Application Priority Data

Feb. 9, 2012 (JP) .................................. 2012-025833

(51) Int. Cl.
| | | |
|---|---|---|
| *C03B 37/012* | (2006.01) | |
| *C03B 37/025* | (2006.01) | |
| *C03B 37/014* | (2006.01) | |

(52) U.S. Cl.
CPC ..... *C03B 37/0124* (2013.01); *C03B 37/01466* (2013.01); *Y02P 40/57* (2015.11)

(58) Field of Classification Search
CPC ................ C03B 37/0124; C03B 37/01446; C03B 37/02736; C03B 37/047
USPC .......................................................... 65/102
See application file for complete search history.

(56) References Cited

U.S. PATENT DOCUMENTS

| | | | |
|---|---|---|---|
| 6,220,057 B1* | 4/2001 | Yamamura | C03B 23/047 65/382 |
| 6,386,001 B1* | 5/2002 | Shimizu et al. | 65/377 |
| 2012/0222452 A1* | 9/2012 | Otosaka | C03B 23/047 65/435 |
| 2013/0186148 A1* | 7/2013 | Otosaka | C03B 37/15 65/435 |

FOREIGN PATENT DOCUMENTS

| | | |
|---|---|---|
| CN | 102001475 A | 4/2011 |
| JP | H05-78139 A | 3/1993 |
| JP | 4395061 B | 1/2010 |
| JP | 4471857 B | 6/2010 |
| WO | WO 2006064608 A1 * | 6/2006 |

OTHER PUBLICATIONS

Notice of Office Action for Chinese Patent Application No. 201310046257.6, issued by the State Intellectual Property Office of Peoples' Republic of China on Oct. 30, 2014.

* cited by examiner

*Primary Examiner* — Jason L Lazorcik
*Assistant Examiner* — Cynthia Szewczyk (57) ABSTRACT

A glass base material elongating method of elongating a glass base material to make a diameter of the glass base material smaller by connecting a pulling dummy at an end of the glass base material and then gripping and pulling the pulling dummy with a pair of rollers that grip or release the pulling dummy is provided. The method includes forming a rough surface part on the pulling dummy before elongating the glass base material.

The rough surface part may be formed by grinding the pulling dummy. Also, the rough surface part of the pulling dummy may have a roughness of 5 μm or more.

9 Claims, 6 Drawing Sheets

GLASS BASE MATERIAL ELONGATING METHOD

CROSS REFERENCE TO RELATED APPLICATION

The contents of the following Japanese patent application are incorporated herein by reference: No. 2012-025833 filed on Feb. 9, 2012.

BACKGROUND

1. Technical Field

The present invention relates to a glass base material elongating method.

2. Related Art

A glass rod with a small diameter such as an optical fiber preform is manufactured by first manufacturing a large-sized glass base material, and then elongating the glass base material. The glass base material is elongated by pulling a pulling dummy that is connected to an end of the glass base material. Japanese Patent No. 4395061 describes that when an optical fiber base material is elongated using a horizontal glass lathe, rough surface parts are provided at parts of dummy rods at both the ends of the optical fiber base material at which the dummy rods are gripped by chucks to prevent slipping between the dummy rods and the chucks. Japanese Patent No. 4471857 describes that a heat-resistant woven fabric is wound around a pulling roller to reduce slipping between the pulling roller and a glass rod.

In the beginning of elongation when elongation of a glass base material is just started, a pulling dummy is pulled with a significant pulling force. Accordingly, in the beginning of elongation, slipping may occur between a pulling roller and a glass base material.

SUMMARY

An aspect of the present invention provides a glass base material elongating method of elongating a glass base material to make a diameter of the glass base material smaller by connecting a pulling dummy at an end of the glass base material and then gripping and pulling the pulling dummy with a pair of rollers that grip or release the pulling dummy, the method including forming a rough surface part on the pulling dummy before elongating the glass base material.

The summary clause does not necessarily describe all necessary features of the embodiments of the present invention. The present invention may also be a sub-combination of the features described above.

DESCRIPTION OF EXEMPLARY EMBODIMENTS

Hereinafter, embodiments of the present invention will be described. The embodiments do not limit the invention according to the claims, and all the combinations of the features described in the embodiments are not necessarily essential to means provided by aspects of the invention.

When a glass rod such as an optical fiber preform is manufactured, a large-sized glass base material 5 formed with quartz and the like is manufactured first. Next, the glass base material 5 is elongated by using an elongating furnace to form a glass rod with a smaller diameter.

Figure 1:
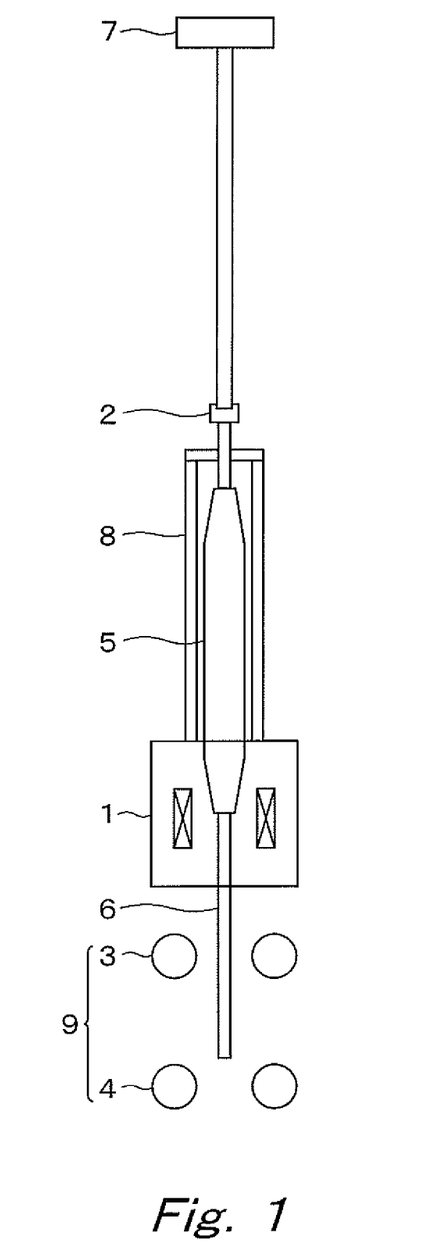
FIG. 1 shows a schematic diagram of an elongating apparatus.

FIG. 1 shows a schematic diagram of an elongating apparatus that can be used to elongate the glass base material 5. The elongating apparatus includes a heating furnace 1, a hanging jig 2, a feeding mechanism 7, a top chamber 8 and a pulling mechanism 9. The pulling mechanism 9 has a plurality of roller pairs 3, 4.

The feeding mechanism 7 hangs the glass base material 5 above the heating furnace 1 using the hanging jig 2. The feeding mechanism 7 is operated to lower the glass base material 5, which is then charged into the heating furnace 1. The circumference of the glass base material 5 hung by the feeding mechanism 7 is covered by the top chamber 8. Thereby, entrance of the outside air into the heating furnace 1, which may cause wear of materials inside the heating furnace 1, can be prevented.

The pulling mechanism 9 is provided below the heating furnace 1. The pulling mechanism 9 has roller pairs 3, 4. The roller pairs 3, 4 are arranged in an up-down direction in the figure, that is, the direction in which the glass base material 5 is elongated. Also, rollers of each one of the roller pairs 3, 4 can be brought closer to each other or separated off from each other to grip or release the pulling dummy 6.

Accordingly, the pulling dummy 6 can be gripped by either one of the roller pairs 3, 4 or by both the roller pairs 3, 4 simultaneously. Also, when a lower end of the glass base material 5 comes down due to elongation, the rollers of the roller pair 3 may be separated off to let the glass base material 5 pass.

The number of the roller pairs 3, 4 each of which grips or releases the glass base material 5 and that are arranged in the direction in which the glass base material 5 is pulled may be larger. Thereby, the elongation amount of the glass base material 5 can be made larger. Also, to keep the elongated glass rod in the vertical position, rollers to guide the elongated glass based material 5 may be provided. The rollers provided to guide the glass base material 5 may not be driven, but rotate passively according to the elongation of the glass base material 5.

When the glass base material 5 is elongated using the elongating apparatus, the glass base material 5 is first hung by the feeding mechanism 7. Next, the pulling dummy 6 gripped by the roller pairs 3, 4 of the pulling mechanism 9 is raised by reversely rotating the roller pairs 3, 4 to make the pulling dummy 6 abut on the lower end of the glass base material 5, and the pulling dummy 6 is heat-bonded to the lower end of the glass base material 5.

Then, the glass base material 5 is elongated by lowering the glass base material 5 by using the feeding mechanism 7 and rotating the roller pairs 3, 4 that grip the pulling dummy 6 to pull the pulling dummy 6 downward. A glass rod with a smaller diameter than that of the glass base material 5 can be fabricated by making the lowering rate (pulling rate) of the pulling mechanism 9 to pull the pulling dummy 6 faster than the lowering rate (feeding rate) of the feeding mechanism 7 to feed the glass base material 5. Appropriate regulation of the feeding fate of the feeding mechanism 7 and the pulling rate of the pulling mechanism 9 contributes to fabricating the glass rod with a desired outer diameter stably.

Surface characteristics of the pulling dummy 6 pulled by the pulling mechanism 9 influence results obtained by elongation of the glass base material 5. If the pulling dummy 6 includes bent parts or has diametrical fluctuation, such characteristics are reflected in the results obtained by elongation of the glass base material 5. Also, if the pulling dummy 6 is scratched or distorted, the pulling dummy 6 itself may fracture to necessitate termination of elongation. Accordingly, the pulling dummy 6 is fabricated to have highly accurate dimensions by using a glass lathe, and minute scratches and residual strains on the surface of the pulling dummy 6 are removed by flame polishing or other processing.

On the other hand, the pulling dummy 6 having a smooth surface due to the above processing easily causes slipping. As a result, slipping may occur between the roller pairs 3, 4 and the pulling dummy 6, for example, in the beginning of pulling when a significant pulling force is applied. If slipping occurs between the roller pairs 3, 4 and the pulling dummy 6, the pulling rate lowers to make the diameter of a glass rod larger, thereby lowering the yield of the fabrication of a glass rod.

If the pulling force applied to the pulling dummy 6 is lowered to prevent slipping between the roller pairs 3, 4 and the pulling dummy 6, slipping may be prevented, but the elongation rate slows down instead. This leads to lowering of the productivity of the fabrication of a glass rod.

Figure 2:
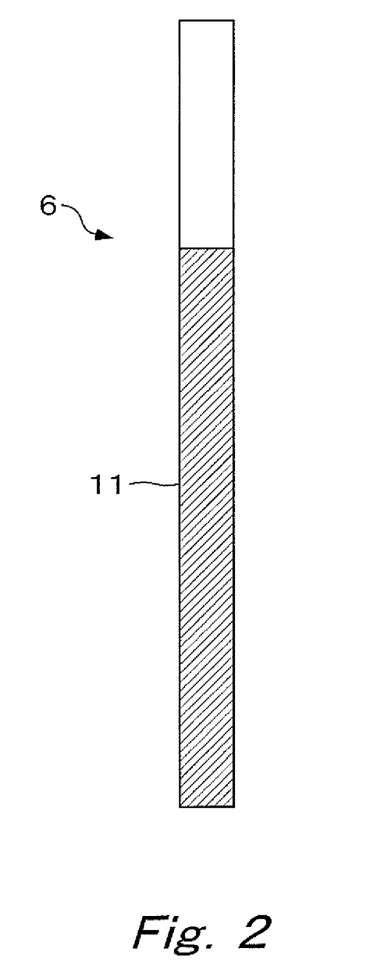
FIG. 2 shows a schematic diagram of a pulling dummy 6.

FIG. 2 shows a schematic diagram showing the pulling dummy 6 singly. As shown in FIG. 2, a part of the surface of the pulling dummy 6 in the longitudinal direction has a rough surface part 11. The pulling dummy 6 is formed, for example, with a quartz glass rod.

In FIG. 2, the rough surface part 11 is provided at a shaded part of the pulling dummy 6. As shown in FIG. 2, the rough surface part 11 is provided at a part on the lower end side of the pulling dummy 6 in the longitudinal direction. The part contacts the roller pairs 3, 4 in the beginning of elongation of the glass base material 5. The rough surface part 11 may be provided over the entire circumference of the pulling dummy 6. Thereby, even if a significant pulling force is applied when pulling of the glass base material 5 is started, slipping between the pulling dummy 6 and the roller pairs 3, 4 can be prevented.

The surface of the pulling dummy 6 may be ground to form the rough surface part 11. Furthermore, the entire circumference of the pulling dummy 6 may be ground to form the rough surface part 11 over the entire circumference of the surface of the pulling dummy 6. For example, by performing cylindrical grinding by using a #100 diamond wheel or the like, the rough surface part 11 having the average surface roughness of about 50 μm can be formed on the surface of the pulling dummy 6.

Figure 3:
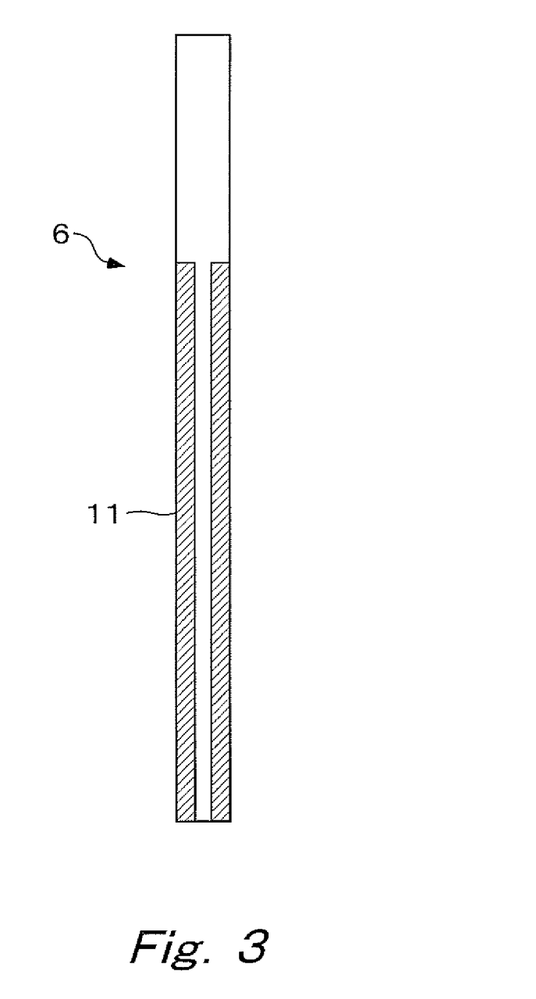
FIG. 3 shows a schematic diagram of another example of the pulling dummy 6.

FIG. 3 shows a schematic diagram showing another example of the pulling dummy 6 singly. As shown in FIG. 3, parts of the surface of the pulling dummy 6 in the circumferential direction at which the pulling dummy 6 contacts the roller pairs 3, 4 has the rough surface part 11. Thereby, the friction of the pulling dummy 6 that acts on the roller pairs 3, 4 is increased to prevent slipping, and the amount of processing necessary to form the rough surface part 11 on the pulling dummy 6 is reduced to shorten working hours. When the rough surface part 11 is formed only at parts at which the pulling dummy 6 contacts the roller pairs 3, 4, the rough surface part 11 can be formed, for example, by grinding the surface of the pulling dummy 6 by using a disk grinder with a #60 diamond wheel or the like.

When the average surface roughness of the rough surface part 11 formed in the above-described manner is less than 5 μm, slipping may not be prevented completely when the glass base material 5 is elongated because the friction of the pulling dummy 6 that acts on the roller pairs 3, 4 is insufficient. Accordingly, the average surface roughness of rough surface part 11 on the surface of the pulling dummy 6 is 5 μm or more, preferably 10 μm or more, and more preferably 30 μm or more. Thereby, the glass base material 5 can be elongated stably.

Figure 4:
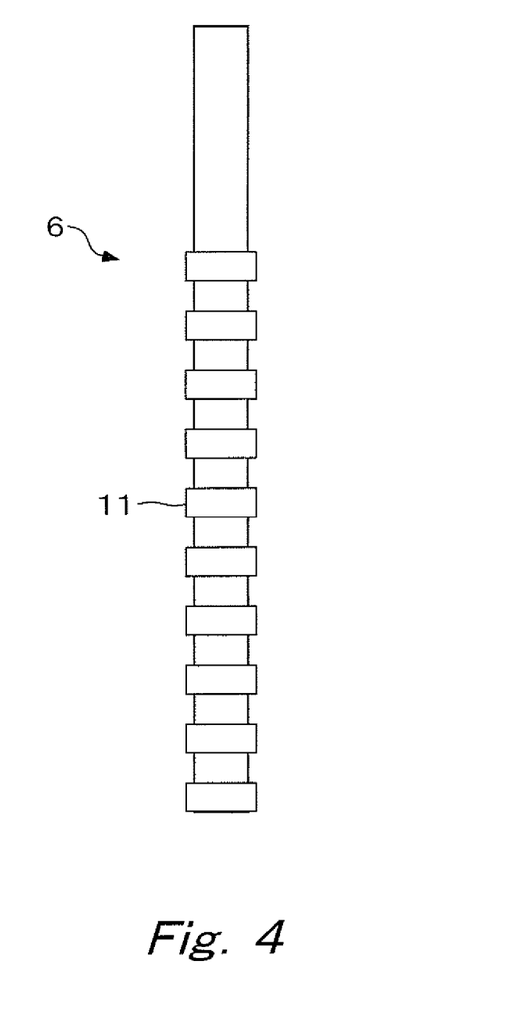
FIG. 4 shows a schematic diagram of another example of the pulling dummy 6.

FIG. 4 shows a schematic diagram showing another example of the pulling dummy 6 singly. As shown in FIG. 4, the surface of the pulling dummy 6 has the rough surface part 11 including comb-shaped steps in which a plurality of steps that elongate across the longitudinal direction of the pulling dummy 6 are formed and arranged in the longitudinal direction of the pulling dummy 6. Thereby, the friction of the pulling dummy 6 that acts on the roller pairs 3, 4 is increased to prevent slipping.

Figure 5:
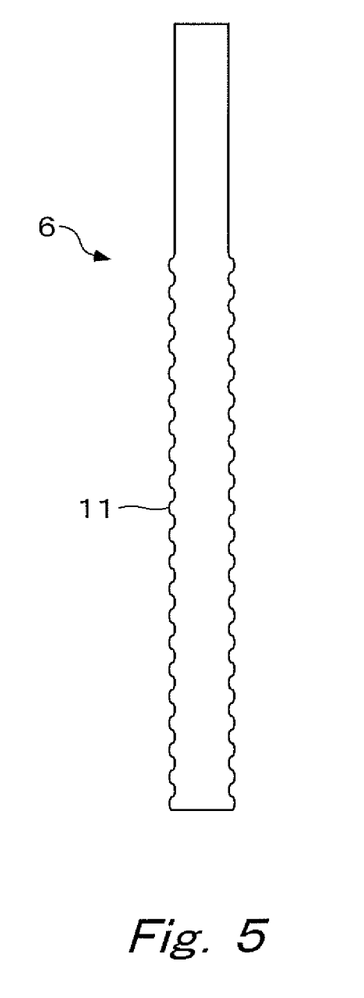
FIG. 5 shows a schematic diagram of another example of the pulling dummy 6.

FIG. 5 shows a schematic diagram showing another example of the pulling dummy 6 singly. As shown in FIG. 5, the surface of the pulling dummy 6 has the rough surface part 11 that is formed with wave-shaped steps that are, when seen in a cross-section taken in the longitudinal direction of the pulling dummy 6, continuous in the longitudinal direction of the pulling dummy 6. Thereby, the frictional of the pulling dummy 6 that acts on the roller pairs 3, 4 is increased to prevent slipping.

By forming the rough surface part 11 in the pulling dummy 6 in this manner, slipping between the pulling dummy 6 and the roller pairs 3, 4 is unlikely to occur, and it becomes possible to suppress diametrical fluctuation in the beginning of elongation when a significant force is required. As a result, the diametrical fluctuation of the obtained glass rod becomes less, and the yield and quality can be improved. Also, because occurrence of slipping is prevented, the pulling rate can be made faster, and the time required for the process can be shortened.

In the above-described example, the glass base material 5 is elongated downward by connecting the pulling dummy 6 at the lower end of the glass base material 5. However, slipping can be prevented by providing the rough surface part 11 on the pulling dummy 6 even in a case that the pulling dummy 6 is combined to the upper end of the glass base material 5.

FABRICATION EXAMPLES

A plurality of the glass base materials 5 were elongated by using the elongating apparatus shown in FIG. 1 and changing conditions for each of the glass base materials 5. The conditions of elongation and the results of elongation are shown in the following Table 1. The glass base material 5 had a length of the straight barrel part of 2,000 mm and the average outer diameter of 180 mm. The glass base material 5 was divided into four, and each one was elongated to attain the target diameter after elongation of 120 mm.

Feedforward control of the diameter after elongation was performed based on shape data measured in advance. Load cells were set to pulling roller pairs, an outer diameter measuring instrument was installed at the exit of the heating furnace 1, pulling loads were monitored in real time during elongation, and outer diameters were monitored after elongation.

The glass base material 5 was set to the above-described apparatus. After heating to a predetermined temperature, the pulling dummy 6 having an outer diameter of 50 mm and a length of 1,500 mm in which a rough surface part was formed from the lower end up to the height of 1,000 mm was welded to the lower end part of the glass base material 5 in the furnace. The glass base material 5 was elongated at predetermined feeding and pulling rates.

Fabrication Example 1

The glass base material 5 was elongated by using the pulling dummy 6 having the rough surface part 11 with the shape shown in FIG. 2. The rough surface part 11 was formed by cylindrical grinding with a diamond wheel, and the average surface roughness was 50 μm.

Fabrication Example 2

The glass base material 5 was elongated by using the pulling dummy 6 having the rough surface part 11 with the shape shown in FIG. 2. The rough surface part 11 was formed by cylindrical grinding with a diamond wheel, and the average surface roughness was 30 μm.

Fabrication Example 3

The glass base material 5 was elongated using the pulling dummy 6 having the rough surface part 11 provided with comb-shaped steps as shown in FIG. 4.

Fabrication Example 4

The glass base material 5 was elongated using the pulling dummy 6 having the wave-shaped rough surface part 11 as shown in FIG. 5.

11 was used. The pulling dummy 6 slipped in the beginning of elongation, and the elongation was interrupted.

Comparative Example 2

The glass base material 5 was elongated under the same conditions with those for the Fabrication Example 1 except for that the pulling dummy 6 not having the rough surface part 11 was used, and the feeding rate of the glass base material 5 by the feeding mechanism 7 was lowered to a third (10 mm/minute) of that of Fabrication Example 1. The elongation was completed without occurrence of slipping of the pulling dummy 6, but because the feeding rate of the glass base material 5 was lowered, the working hours trebled.

Comparative Example 3

The glass base material 5 was elongated under the same conditions with those for the Fabrication Example 1 except for that the pulling dummy 6 not having the rough surface part 11 was used, and the feeding rate of the glass base material 5 by the feeding mechanism 7 was lowered to a half (15 mm/minute) of that of Fabrication Example 1. The elongation was completed continuously without interruption, but the working hours doubled. In addition, slipping occurred in the beginning of elongation, and diametrical fluctuation was observed in the glass rod after elongation. As a result, the yield was lowered.

TABLE 1

| | | Diameter after Elongation mm | Shape of Rough Surface Part of Pulling Dummy | Feeding Rate mm/minute | Diametrical Fluctuation after Elongation mm | Note |
|---|---|---|---|---|---|---|
| Fabrication Examples | 1 | 120 | Cylindrical grinding Average surface roughness of 50 μm | 30 | 1.0 | Good with no slipping and less diametrical fluctuation |
| | 2 | 120 | Cylindrical grinding Average surface roughness of 30 μm | 30 | 1.1 | Good with no slipping and less diametrical fluctuation |
| | 3 | 120 | Comb-shape | 30 | 0.9 | Good with no slipping and less diametrical fluctuation |
| | 4 | 120 | Wave-shape | 30 | 1.0 | Good with no slipping and less diametrical fluctuation |
| Comparative Examples | 1 | 120 | No rough surface part | 30 | — | Interrupted due to slipping |
| | 2 | 120 | No rough surface part | 10 | 1.0 | No slipping and less diametrical fluctuation, but low production rate |
| | 3 | 120 | No rough surface part | 15 | 5.5 | Slipping in the beginning of elongation |

As regards Fabrication Examples 1 to 4, the glass base material 5 could be elongated stably from the beginning to the end at the average feeding rate of 30 mm/minute without occurrence of slipping of the pulling dummy 6. The diametrical fluctuation of the effective part after elongation was 0.9 to 1.1 mm, which was within 1% of the diameter after elongation.

Comparative Example 1

Figure 6:
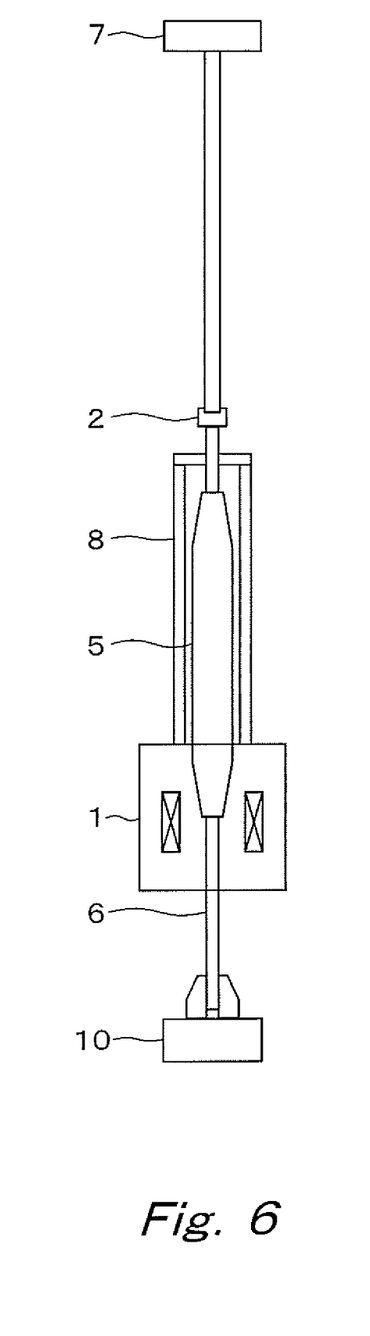
FIG. 6 shows a schematic diagram of another example of the elongating apparatus.

The glass base material 5 was elongated under the same conditions with those for Fabrication Example 1 except for that the pulling dummy 6 not having the rough surface part FIG. 6 shows a schematic diagram of another example of the elongating apparatus. The elongating apparatus shown in FIG. 6 includes the heating furnace 1, the hanging jig 2, the feeding mechanism 7 and the top chamber 8. Furthermore, the elongating apparatus includes a pulling chuck 10 in place of the roller pairs 3, 4 provided in the elongating apparatus shown in FIG. 1.

When the elongating apparatus is used, the pulling dummy 6 is gripped by the pulling chuck 10 to elongate the glass base material 5. Gripping surfaces of the pulling chuck 10 are curved to have curvature that is substantially the same as that for the circumferential surface of the pulling dummy 6. Thereby, the contact area between the pulling chuck 10 and the pulling dummy 6 is increased to prevent slipping therebetween.

The pulling rate may be controlled to avoid scratches on the surface of the pulling dummy 6. In this case, however, the length of a glass road obtained by elongation is limited because the pulling dummy 6 cannot be pulled more than the stroke of the pulling chuck 10.

In contrast, when the pulling mechanism 9 including the roller pairs 3, 4 shown in FIG. 1 is used, such limitation in the pulling amount of the pulling mechanism 9 can be avoided by, for example, elongating the glass base material 5 while removing parts of the pulling dummy 6 and the glass base material 5 that have come below the lower roller pair 4. Accordingly, a longer glass rod can be fabricated from the large-sized glass base material 5.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A glass base material elongating method of elongating a glass base material that is hung in a vertical direction to make a diameter of the glass base material smaller by connecting a pulling dummy at an end of the glass base material and then gripping and pulling the pulling dummy with a pair of rollers that grip or release the pulling dummy, the method comprising:
    forming a rough surface part on the pulling dummy before elongating the glass base material;
    wherein forming the rough surface part on the pulling dummy comprises forming a plurality of steps elongating across a longitudinal direction of the pulling dummy, and arranging the plurality of steps in the longitudinal direction.

2. The glass base material elongating method according to claim 1, wherein forming the rough surface part on the pulling dummy comprises grinding the pulling dummy.

3. The glass base material elongating method according to claim 1, wherein the rough surface part of the pulling dummy has a roughness of 5 μm or more.

4. The glass base material elongating method according to claim 3, wherein the rough surface part of the pulling dummy has a roughness of 10 μm or more.

5. The glass base material elongating method according to claim 4, wherein the rough surface part of the pulling dummy has a roughness of 30 μm or more.

6. The glass base material elongating method according to claim 1, wherein forming the rough surface part on the pulling dummy comprises making the surface of the pulling dummy comb-shape.

7. The glass base material elongating method according to claim 1, wherein forming the rough surface part on the pulling dummy comprises making the surface of the pulling dummy wave-shape.

8. The glass base material elongating method according to claim 1, wherein the rough surface part of the pulling dummy is formed at a part of the pulling dummy in a circumferential direction at which the pulling dummy abuts on the pair of rollers.

9. The glass base material elongating method according to claim 1, wherein the rough surface part of the pulling dummy is formed so that a plurality of pairs of rollers contact the rough surface part.

* * * * *